United States Patent [19]

Dorival

[11] Patent Number: 4,866,561

[45] Date of Patent: Sep. 12, 1989

[54] LIGHTNING ARRESTER DEVICE COMPRISING AT LEAST ONE FUSIBLE ELEMENT

[75] Inventor: Michel Dorival, Orsay, France

[73] Assignee: Compagnie Industrielle de Tubes et Lampes Electriques Citel, Issy-les-Moulineaux, France

[21] Appl. No.: 259,014

[22] Filed: Oct. 17, 1988

[30] Foreign Application Priority Data

Oct. 16, 1987 [FR] France ............................... 87 14299

[51] Int. Cl.[4] ............................................ H02H 3/22

[52] U.S. Cl. .................................... 361/119; 361/124; 361/120; 337/32

[58] Field of Search ................ 361/103, 104, 119–120, 361/124, 128, 129; 337/28, 29, 31–34, 18, 17, 20

[56] References Cited

U.S. PATENT DOCUMENTS 3,038,046 6/1962 Devine et al. .
3,522,570 8/1970 Wanaselja .
4,056,840 11/1977 Lundsgaard et al. .
4,062,054 12/1977 Simokat ............................. 361/119

FOREIGN PATENT DOCUMENTS 2574589 6/1986 France .

*Primary Examiner*—Todd E. DeBoer

*Attorney, Agent, or Firm*—Armstrong, Nikaido, Marmelstein, Kubovcik & Murray

[57] ABSTRACT

The lightning arrester device comprises an external metal casing (1) defining an enclosure (2) containing a neutral gas, and at least one metal rod (3*a*, 3*b*) forming an electrode and penetrating into the interior of the casing, insulating sealing means (4) being provided between the rod and the casing in order to close said casing, and comprising, moreover, at least one fusible element (5) adapted to create a short circuit between the electrode (3*a*, 3*b*) and the casing (1) when the quantity of energy to be diverted by the lightning arrester device exceeds a specified threshold. On its external wall, near one of its ends receiving an electrode (3*a*, 3*b*), the metal casing (1) comprises a housing (L), the fusible element (5) being disposed in said housing, and a strip (9) of insulating material surrounds said fusible element and the housing, said strip (9) comprising holes (10) and being itself surrounded by a conductive metal ring (11) electrically connected to the electrode, the whole unit being such that when there is a rise in temperature in the casing, the fusible element (5) begins to melt and flows through at least one hole (10) in the insulating strip to create a short circuit electrical contact between the casing (1) and the metal ring (11) connected to the electrode.

8 Claims, 1 Drawing Sheet

LIGHTNING ARRESTER DEVICE COMPRISING AT LEAST ONE FUSIBLE ELEMENT

Figure 1:
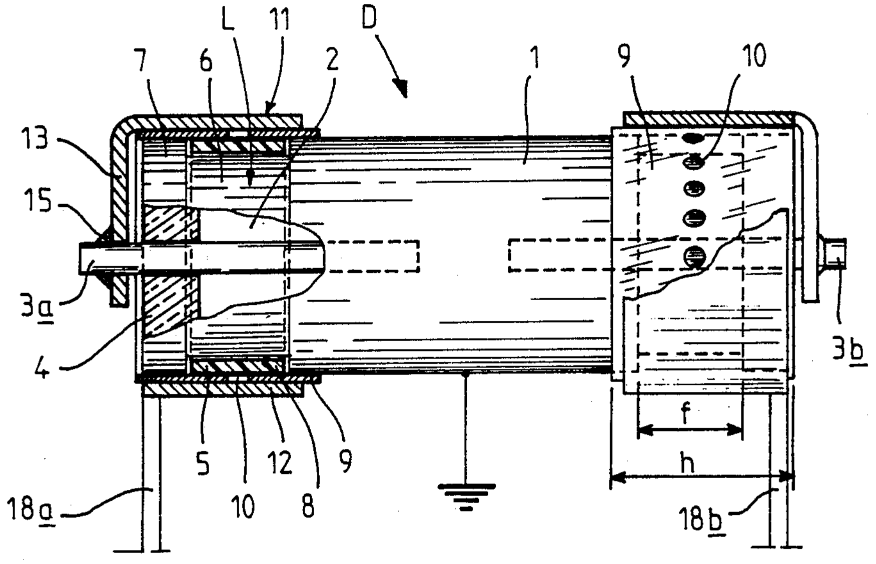

The invention relates to a lightning arrester device of the type comprising an external metal casing defining an enclosure containing a neutral gas, and at least one metal rod forming an electrode and penetrating into the interior of the casing, insulating sealing means being provided between the rod and the casing in order to close said casing, and comprising, moreover, at least one fusible element adapted to create a short circuit between the electrode and the casing when the quantity of energy to be diverted by the lightning arrester device exceeds a specified threshold.

It is known that lightning arrester devices of this kind are adapted to be installed on the power lines of electronic installations such as telephone exchanges, computer equipment, etc., which have to be protected against overvoltages which can cause serious damage. These lightning arrester devices are adapted to divert those overvoltages which can be caused by external conditions, such as lightning falling on a power line.

In certain exceptional cases, the quantity of energy which has to be diverted by the lightning arrester device exceeds the normal capabilities of the device, so that there is a rise in temperature which can result in the destruction of the device and inefficient protection by a device of this kind. Therefore it was proposed to introduce at least one fusible element into the lightning arrester device, said fusible element being adapted to create a short circuit between the electrode and the casing when such a rise in temperature occurs in the lightning arrester device because the quantity of energy to be diverted is too great.

FR-A-2574589 discloses a lightning arrester device of this kind. In a device of this kind, the fusible element is formed by a washer mounted at the end of the external metal casing. This washer is relatively exposed to atmospheric agents which may contain pollutants capable of reducing the efficiency of the fusible element. Moreover, the fact that said fusible element is mounted on the end of the metal casing increases the space occupied by the lightning arrester device in the axial direction of said device.

The object of the invention is above all to produce a lightning arrester device of the type specified hereinabove which meets the various practical requirements more fully than hitherto and which, inter alia, ensures better protection for the fusible element or elements against atmospheric agents, with the space it occupies in axial direction being reduced. It is moreover desirable for the manufacture of a lightning arrester device of this kind to be as simple as possible.

According to the invention, a lightning arrester device of the type specified hereinabove is characterised in that on its external wall, near one end receiving an electrode, the metal casing comprises a housing , the fusible element being disposed in said housing, and a strip of insulating material surrounds said fusible element and the housing, said strip comprising holes and being itself surrounded by a conductive metal ring electrically connected to the electrode, the whole unit being such that when there is a rise in temperature in the casing, the fusible element begins to melt and flows through at lesat one hole in the insulating strip to create a short circuit electrical contact between the casing and the metal ring connected to the electrode.

Thus, according to the invention, the presence of at least one fusible element does not increase the space occupied by the device in axial direction of said device, and this fusible element is well protected against atmospheric agents which could reduce its efficiency.

The housing provided on the external wall of the metal casing is preferably in the form of an annular groove.

The fusible element is advantageously formed by a strip of fusible material coiled up in the annular groove. The thickness of this material is no greater than the depth of the groove.

The strip of fusible material is advantageously obtained by flattening a wire of circular section normally used for soldering electrical components. Fusible element wire of this kind comprises a cleaning product housed within microchannels in such a way that it is protected against atmospheric agents and pollutants.

The conductive metal ring electrically connected to the electrode is preferably obtained by coiling a metal strip which comprises, approximately halfway along its length, a transverse extension adapted to be bent back at a right angle to make the electrical connection with the electrode; preferably, the metal strip comprises, at each of its ends, a longitudinal extension, these two extensions meeting to form a pin when the strip is coiled.

In the case of a tripolar lightning arrester device, comprising two line electrodes, i.e. one electrode associated with each end of the external metal casing, said metal casing being adapted to be connected to earth, on its external wall, near each of its ends, said metal casing comprises a housing, in particular, an annular groove for receiving the fusible element, which is surrounded by a strip of insulating material, said strip comprising holes and being itself surrounded by a conductive metal ring electrically connected to the associated electrode, the whole unit being such that when there is a rise in temperature in the casing, at least one fusible element begins to melt and flows through at least one hole in the corresponding insulating strip in order to create a short circuit electrical contact between the casing and the metal ring connected to the electrode.

Besides the features specified hereinabove, the invention consists of a number of other features which will be dealt with more explicitly hereinafter in connection with a particular embodiment which is described in detail with reference to the accompanying drawings, but which is in no way limiting.

FIG. 1 is a front view with broken out sections and a removed section of a tripolar lightning arrester device according to the invention.

Figure 2:
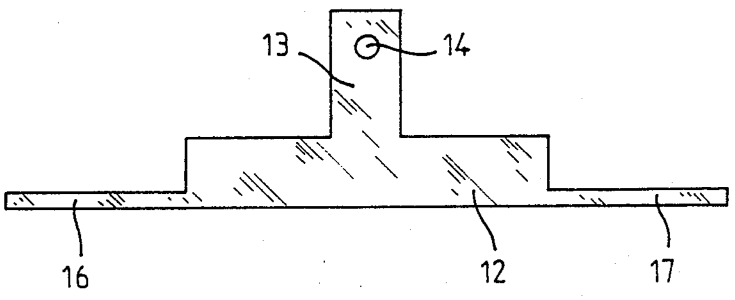

FIG. 2, finally, is an enlarged view of a metal strip adapted to form a ring which is connected to an electrode.

Referring to the drawings, in particular to FIG. 1, they show a lightning arrester device D for protecting a circuit or an installation against overvoltage. This device comprises an external metal casing 1 defining an enclosure 2 containing an inert gas under controlled pressure. This gas may be argon and the pressure may be higher or lower than atmospheric pressure. In the example illustrated, the casing 1 is formed by a metal cylinder of revolution. The device D is of the tripolar type and is equipped at each end of the casing 1 with a metal rod 3a, 3b forming an electrode and penetrating into the interior of the casing 1. The electrodes 3a and 3b are aligned and arranged coaxially in the casing 1.

The ends of the electrodes disposed inside the casing 1 are at a distance from one another in axial direction.

Insulating sealing means 4 are provided between each rod 3a and 3b and the casing 1 in order to close the corresponding end of said casing; these means may comprise a glass bead or an equivalent means.

The lightning arrester device D moreover comprises at least one fusible element 5 in order to create a short circuit between one electrode and the casing 1 when the quantity of energy to be diverted by the lightning arrester D exceeds a specified threshold.

On its external wall, near each of its ends receiving an electrode, the metal casing comprises a housing L, the fusible element 5 being disposed in said housing.

This housing L is advantageously formed by an annular groove 6 provided in the external wall of the casing 1 and disposed near each end. This groove 6 is separated from said end by a cylindrical shoulder 7 the external diameter of which is the same as that of the casing 1. The depth of the housing L is such that the fusible element 5 does not project out with respect to the external surface of the casing 1. If the housing L is formed by an annular groove 6, the depth of this housing is equal to the difference between the external radius of the casing 1 and the radius of the bottom of the groove 6.

The fusible element 5 is advantageously formed by a strip 8 of fusible material coiled up in the annular groove 6. The length of this strip 8 is selected such that it is equal to the circumference of the bottom of the groove 6 and that the coiled strip 8 forms a cylindrical ring, completely housed in the groove 6, its ends joined end to end.

This strip 8 is preferably obtained by flattening a wire of circular section normally used for soldering electrical components and in the form of , e.g. a lead-tin eutectic alloy. A soldering wire of this kind contains a cleaning product disposed in microchannels and isolated from the atmosphere. Consequently, the strip 8 obtained by flattening the wire also contains a cleaning product housed in microchannels; this cleaning product is thus protected from pollutant atmospheric agents and retains all its efficiency, only taking effect when the strip 8 melts.

Each fusible element 5 is surrounded by a strip 9 of insulating material, said strip comprising holes 10 distributed along its entire length. The strip 9 is advantageously made of polyimide with a high insulating capacity.

As can be seen in the drawing, the insulating strip 9 is coiled around the fusible element 5 so that it forms a type of cylindrical ring. The width h of this strip 9, which corresponds to the axial length of the ring formed by the coiled strip, is greater than the width f of the groove 6 and the fusible element 5. Thus, the strip 9 can completely cover the element 5 and the groove 6 and can extend beyond the groove at both sides of the latter in order to provide good insulation.

The insulating strip 9 is itself surrounded by a conductive metal ring 11, electrically connected to the electrode **3*a* or 3*b*** of the end in question.

Each metal ring 11 is advantageously obtained by coiling a flat metal strip 12 (FIG. 2) which comprises halfway along its length a transverse extension 13 adapted to be bent back approxiamtely at a right angle radially towards the interior, as illustrated in FIG. 1. Towards the end remote from the central section of the strip 12, this extension 13 comprises a hole 14 through which the associated electrode passes (see FIG. 1), a soldered joint 15 being effected at this hole between the electrode and the extension 13 to ensure good electrical continuity.

Instead of the hole 14, the extension 13 could comprise a tongue cut along two long orthogonal sides in the average direction of the adjacent strip 12 along one short side at one zone of the extension 13, the other short side of which would be aligned with the edge of the extension 13 remote from the strip 12. When the extension 13 is bent back, this tongue would be bent approximately at a right angle towards the exterior in order to take effect and be soldered on to the electrode **3*a***.

As can be seen in FIG. 2, at each of its longitudinal ends, along the edge furthest from the section 13, the strip 12 comprises two extensions 16, 17 , the width of which is smaller than that of the strip 12. When said strip 12 is coiled into a cylindrical ring, the two extensions 16, 17 are disposed in the diametrical plane of symmetry of the section 13 which is bent back and are joined together in such a way that they form a pin respectively **18*a*, 18*b* electrically connected to the corresponding electrode 3*a*, 3*b*. These pins 18*a*, 18*b* are adapted to be plugged into a base which is not shown, permitting the device D to be inserted into a line connected to the installation to be protected. The metal casing 1 is connected to earth, as shown in schematic form in FIG. 1**.

This being the case, the lightning arrester device D operates as follows.

When the lightning arrester D is subjected to an overvoltage and has to divert a quantity of energy which exceeds a specified threshold, there is a rise in temperature in the casing 1. This rise in temperature is transmitted to the fusible elements 5 provided at each end of the casing. When one of these elements 5 reaches its melting point, it turns into a liquid and can flow through certain holes 10 to make an electrical connection between the casing 1 and the metal ring 11, and thus the corresponding electrode. The cleaning product included in the fusible element 5 helps to establish a good electrical contact and an effective soldered joint when it has cooled down.

A short circuit is thus created between the casing 1 and at least one of the electrodes **3*a*, 3*b*, making it possible to divert the surplus electrical energy. The lightning arrester device D is preferably disposed with its axis approximately horizontal as illustrated in FIG. 1, but it would be possible to mount it in a different manner because the fusible element 5 is virtually enclosed in a volume limited by the groove 6 and the insulating strip 11 and when it melts can only come into contact with the ring 11 by flowing through the holes 10**.

The space occupied in axial direction by the device D according to the invention is reduced since the fusible elements 5 are disposed on the external face of the casing 1. Each fusible element 5 is well protected against the external atmosphere. It is virtually impossible for this fusible element and the cleaning product it may contain to absorb any atmospheric humidity, thus reducing the risk of deterioration of the cleaning product.

The short circuit created with a device D according to the invention is created under good conditions and in an effective manner.

The embodiment described relates to a tripolar device. Of course, the invention can also apply to a bipolar device.

What is claimed is:

1. A lightning arrester device comprising an external metal casing (1) defining an enclosure (2) containing a neutral gas and at least one metal rod (3*a*, 3*b*) forming an electrode and penetrating into the interior of the casing, insulating sealing means (4) being provided between the rod and the casing in order to close said casing, at least one fusible element (5) adapted to create a short circuit between the electrode (3*a*, 3*b*) and the casing (1) when the quantity of energy to be diverted by the lightning arrester device exceeds a specified threshold, characterised in that the external wall of said casing near one end receiving an electrode (3*a*, 3*b*) defines a housing (L), the fusible element (5) being disposed in said housing, and a strip (9) of insulating material surrounds said fusible element and the housing, said strip (9) comprising holes (10) and being itself surrounded by a conductive metal ring (11) electrically connected to the electrode, the whole unit being such that when there is a rise in temperature in the casing, the fusible element (5) begins to melt and flows through at least one hole (10) in the insulating strip to form a short circuit electrical contact between the casing (1) and the metal ring (11) connected to the electrode.

2. A device according to claim 1, characterised in that the housing (L) provided by the external wall of the metal casing (1) is in the form of an annular groove.

3. A device according to claim 2, characterised in that the fusible element (5) is formed by a strip (8) of fusible material coiled up in the annular groove (6).

4. A device according to claim 3, characterised in that the thickness of the strip (8) of fusible material is no greater than the depth of the groove.

5. A device according to claim 3 or 4, characterised in that the strip (8) of fusible material is obtained by flattening a wire of circular section normally used for soldering electrical components, said wire comprising a cleaning product housed within microchannels.

6. A device according to any one of claim 1–4, characterised in that the conductive metal ring (11) electrically connected to the electrode is obtained by coiling a metal strip (12) which comprises, approximately halfway along its length, a transverse extension (13) adapted to be bent back at a right angle to make the electrical connection with the electrode.

7. A device according to claim 6, characterised in that the metal strip (12) comprises, at each of its ends, a longitudinal extension (16, 17), these two extensions meeting to form a pin (18*a*, 18*b*) when the strip (12) is coiled.

8. A lightning arrester device according to any one of claims 1–4, comprising two electrodes (3*a*, 3*b*), one electrode associated with each end of the external metal casing (1), said metal casing being adapted to be connected to earth, characterised in that the external wall near each of the ends of said metal casing (1) defines a housing (L) which forms an annular groove (6) for receiving the fusible element (5), which is surrounded by a strip (9) of insulating material, said strip comprising holes (10) and being itself surrounded by a conductive metal ring (11) electrically connected to the associated electrode (3*a*, 3*b*), the whole unit being such that when there is a rise in temperature in the casing, at least one fusible element (5) begins to melt and flows through at least one hole (10) in the corresponding insulating strip (9) in order to form a short circuit electrical contact between the casing (1) and the metal ring (11) connected to the electrode.

* * * * *